H. B. WHITE.
FILING APPLIANCE.
APPLICATION FILED JULY 2, 1908.

1,166,396.

Patented Dec. 28, 1915.
5 SHEETS—SHEET 4.

Witnesses
Edwin L. Bradford
C. C. Wright

Inventor
Harry B. White,
By Edward R. Alexander
Attorney

H. B. WHITE.
FILING APPLIANCE.
APPLICATION FILED JULY 2, 1908.

1,166,396.

Patented Dec. 28, 1915.
5 SHEETS—SHEET 5.

Witnesses
Edwin L. Bradford
C. C. Wright

Inventor
Harry B. White,
By Edward R. Alexander
Attorney

UNITED STATES PATENT OFFICE.

HARRY B. WHITE, OF CANTON, OHIO, ASSIGNOR TO STEWART S. KURTZ, OF CANTON, OHIO.

FILING APPLIANCE.

1,166,396.  Specification of Letters Patent.  Patented Dec. 28, 1915.

Application filed July 2, 1908. Serial No. 441,690.

*To all whom it may concern:*

Be it known that I, HARRY B. WHITE, a citizen of the United States, residing at Canton, in the county of Stark and State of Ohio, have invented certain new and useful Improvements in Filing Appliances, of which the following is a specification, reference being had therein to the accompanying drawings.

This invention relates to cabinets or holders for the sales slips by means of which individual credit accounts are now largely kept; and has for its object to produce an appliance provided with a set or sets of superposed trays and with improved means for operating and supporting the trays to be hereinafter described.

In the accompanying drawings, wherein there is illustrated one embodiment of the present invention.

Figure 5:
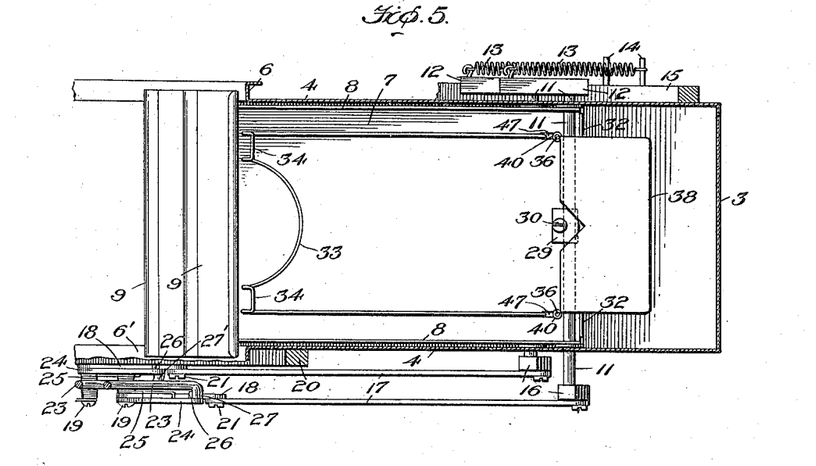
Fig. 5 is a transverse section taken between two of the trays.

An accounting appliance made according to the present invention preferably consists of a set of individual units which may be placed in an inclosing case, not shown in the drawings, the units or sections being many or few, and each containing more or less trays or carriers for individual accounts, accordingly as the number of accounts to be provided for is large or small. Each unit or section, which is preferably removable from the inclosing case independently of each other one and in itself is a complete device, comprises a base 2, preferably formed of sheet metal; an inclined back 3, and a pair of sides 4, 4. The back and sides are preferably unitary, as represented in Fig. 5 and formed of sheet metal, and are secured to the base by brackets 5, or otherwise. The front edge of each side, 4, is stiffened, preferably being bent to form a flange 6, the flange on one side being of considerable width, as indicated at 6' for a purpose to be described.

The parts thus far described constitute a trough-shaped structure open at the front and top and inclining backward, in which are mounted the trays for carrying the individual account slips. Each tray preferably consists of a bottom 7, flanges 8, 8, constituting the side walls of the trays, and a front piece 9, the latter being shaped to receive a name card 10, indicating the individual whose account is carried in that tray. Each tray is pivoted near its rear end upon a shaft or rod 11, supported in the side walls 4 of the frame, and preferably extends, at the front, beyond the flanges 6, 6' of the frame, the front pieces 9 overlying these flanges to a greater or less extent for convenience of arrangement and manipulation. It may be stated that the trays are so mounted that they lie in a superposed series each being tiltable to permit the free raising and lowering of its front end.

I provide means for counterbalancing each tray individually, and for holding it in raised position to expose the tray next below. While various mechanisms for counterbalancing the trays may be employed, the one shown consists of a spring held under tension and so united with the tray that when the front edge of the latter is raised slightly the spring exerts its force to automatically lift it and hold it in raised position.

12, indicates a crank arm secured to one end of the pivot rod 11, outside one of the side walls of the frame; and 13 indicates a spring connected at one end to the crank arm and at its other end to a pin or other fixed support 14, carried by the frame. It will be understood that each tray is connected with a counterbalancing spring 13, except the lowermost one of the series, where the spring may be omitted as this tray does not need to be lifted and held in raised position.

Figure 2:
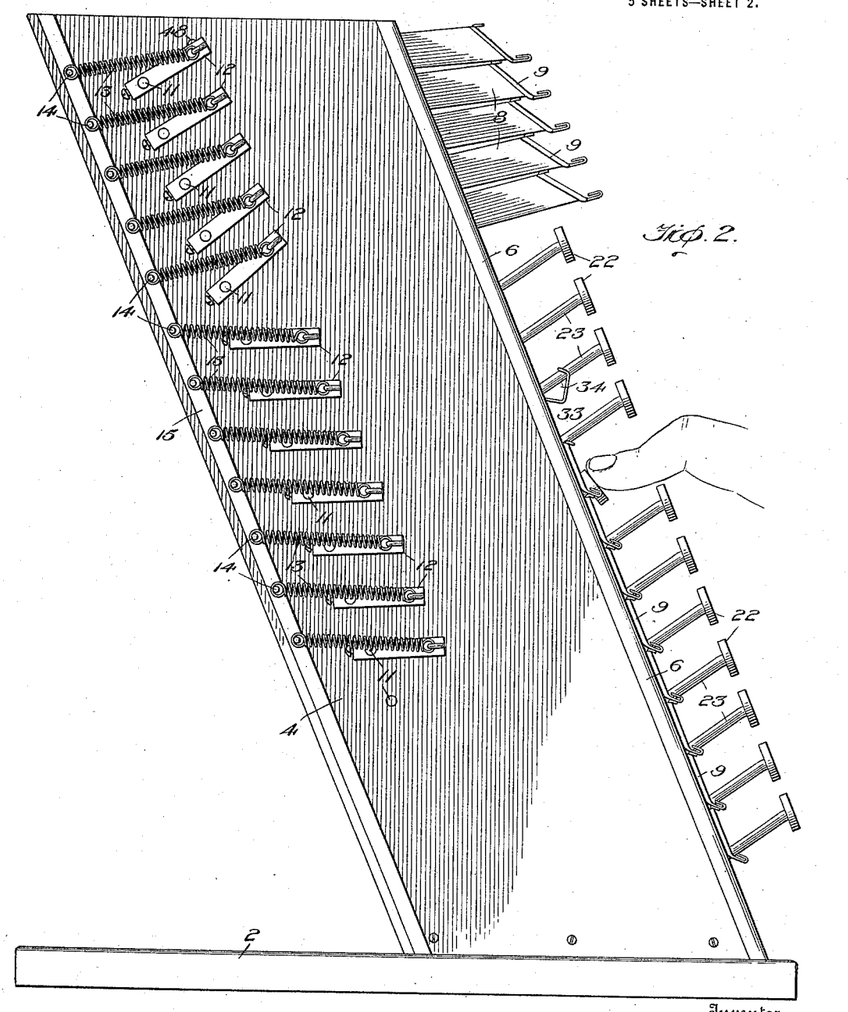
Fig. 2 is an elevation illustrating the opposite side of the section from that shown in Fig. 1.
Figure 3:
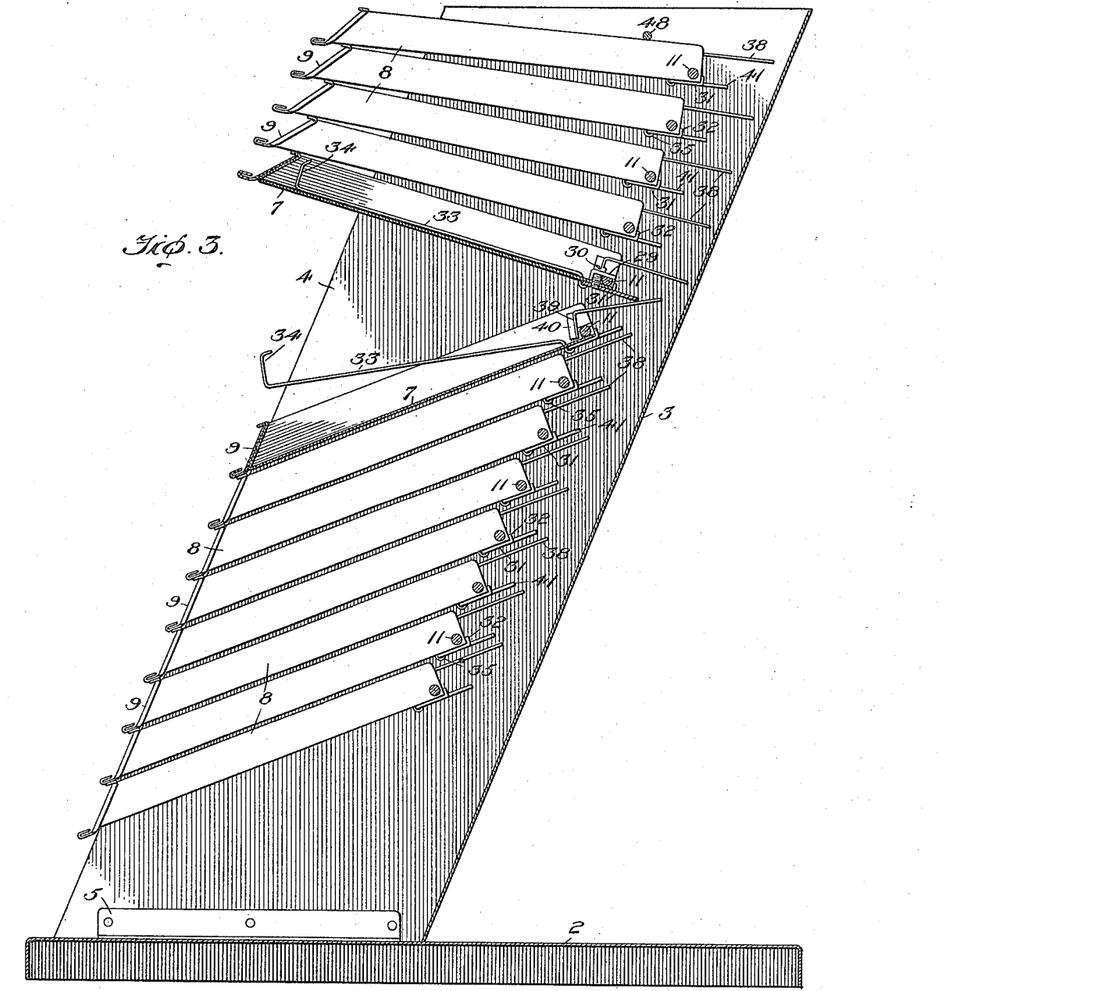
Fig. 3 is a central vertical section taken through a unit.
Figures 4, 8, 9, 10:
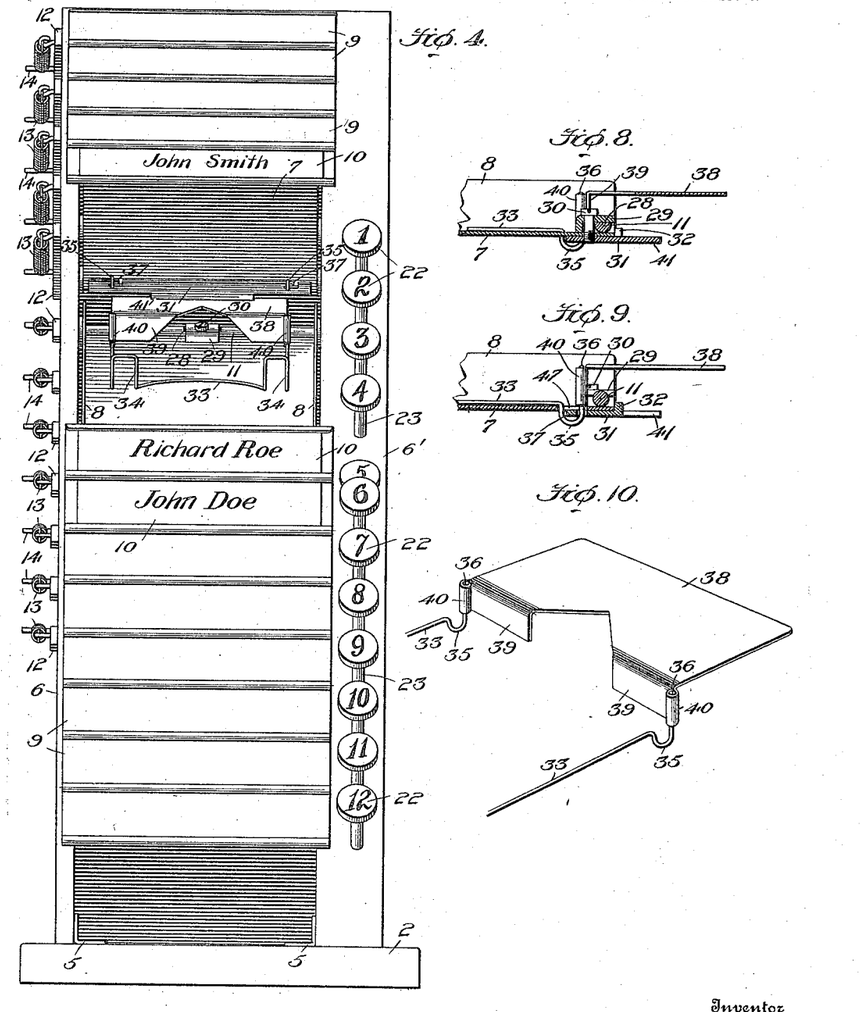
Fig. 4 is a front view.
Fig. 8 is a cross sectional view taken on the line VIII—VIII of Fig. 7.
Fig. 9 is a cross sectional view taken on the line IX—IX of Fig. 7.
Fig. 10 is a perspective view of the rear end of one of the supporting or lifting frames for the account slips.

The pins 14 or other stationary connections for the springs, are preferably carried by a strip 15, secured to the outer face of the side wall of the frame. It will be seen, by reference to Fig. 2, that when the trays are in normal position, that is, when their front free ends are down, the bill-holding compartments being then closed, the springs exert little, if any, lifting power upon the trays, the lines of force exerted by them crossing or very nearly so, the axes of oscillation of the trays; but that as soon as the front edges of the trays are slightly raised the springs exert a lifting action which is greatest when the trays attain their highest position.

The trays thus counterbalanced may be operated by hand, the user catching the edge of the front piece of the tray above the one to be opened and lifting it and those above, each spring assisting in the lifting operation and serving to hold its own tray when raised. I prefer, however, to provide means for lifting the individual trays and to provide for the working of such means by keys or push buttons. Each pivot rod, except that for the lowermost tray of a set, is provided with a crank arm 16, which is preferably located outside the wall 4, at the end of the shaft opposite the crank arm 12. A link 17 connects this crank arm 16 with a link 18, that is hung near one end upon a pivot 19, carried by some stationary part of the frame, such as the bar 20. The pivotal relations of these parts—crank arm 16, and the links 17 and 18—are such that when the trays are in normal position, that is, down or closed, the links extend approximately in the same direction, the angle at their point of connection 21, being broad or very obtuse, while the angle between the crank arm 16, and the link 17, approximates a right angle. These relations I have found well suited to accomplish the results desired, although they may be varied to a considerable extent.

Figure 1:
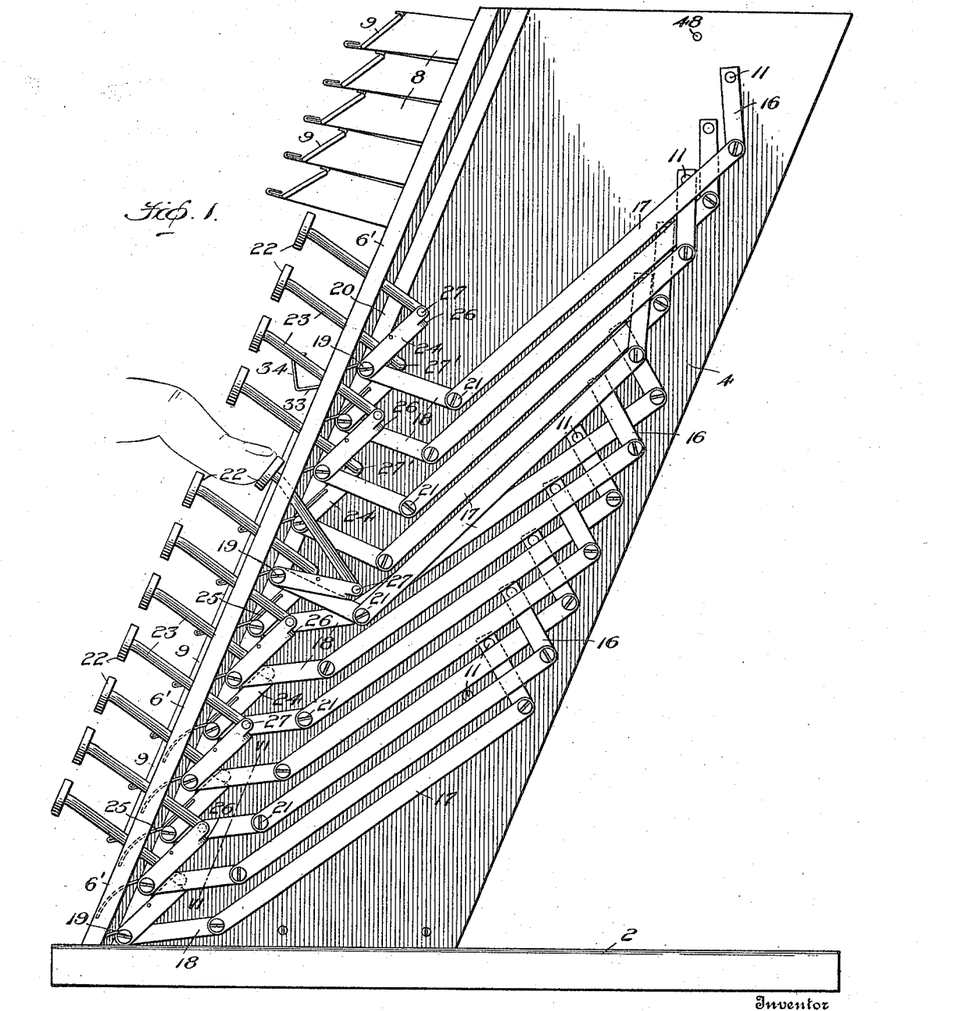
Figure 1 is a side elevation of an individual unit or section of the appliance.

22, 22 indicate a series of finger keys or push buttons, mounted on stems 23, and located alongside the set of trays, there being a key for each tray except the last, which does not require one. The keys, by location or designation, are each related to a tray so that the user may easily determine which key to operate in order to lift a particular tray. The stems, 23, of the keys extend through perforations in the edge flange, 6', of the supporting frame, this flange being broader than the one 6, to accommodate the keys and also to shield and protect the operating devices through which the individual trays are lifted. The keys are pivotally connected with links 24, hung upon the pivot pins 19, already referred to. Coiled springs, 25, encircle the pins 19, and are connected each at one end with links 24, and operate to maintain the keys normally in lifted position. Each link 24 is formed with an offset or finger 26, mounted to overlie one of the links 18. Whenever a key is depressed a link 24 is rocked and its finger 26, caused to bear upon the upper edge of a link 18, provided such link be standing in its normal position as represented in the lower part of Fig. 1. This engagement of the links 24 and 18 turns the latter upon its pivot 19, draws forward the link 17, which in turn rocks the shaft 11, and lifts the tray corresponding with the key that has been pressed, as is clearly indicated in the middle part of Fig. 1. As the trays rest upon each other at their front ends the lifting of any intermediate one raises all those above, but as each tray is provided with an individual counterbalancing means the force required to open the lowermost tray of the series is but little greater than that required to open one near the top of the set.

Figure 6:
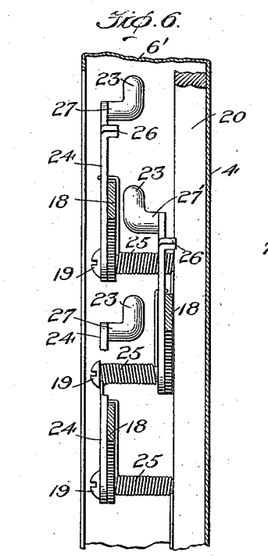
Fig. 6 is a detail sectional view taken on the line VI—VI of Fig. 1.
Figure 7:
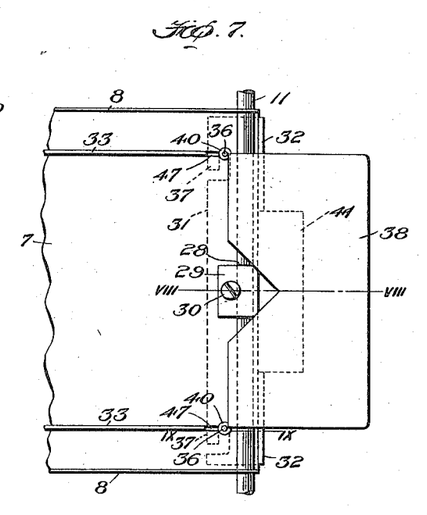
Fig. 7 is a detail plan view of the rear or pivoted portion of one of the trays.

In order to provide for compactly mounting the connecting devices between the finger keys and the pivot rods of the trays, they are preferably arranged in two tiers or sets, one nearer the face of the side wall, 4, of the frame than the other, the successive connecting parts being located in alternate tiers. To provide for this arrangement the inner ends of certain of the stems of the finger keys are turned outward, as indicated at 27, to connect with the links 24, while the ends of the alternate keys turn inward, as indicated at 27', see particularly Fig. 6.

48 is a cross bar serving to limit the upward movement of the uppermost tray of the series. Each tray below the uppermost one serves as a stop for the one being raised.

The method of connecting a tray with its pivot rod 11, so that the two may turn together, is a novel method, and is illustrated in detail in Figs. 5, 7, 8 and 9.

A portion of the shaft or pivot rod 11, is slabbed off or flattened, as represented at 28, and with this part of the shaft there engages a clamp block 29, carried by the tray. A plate 31 lies below the rear portion of the tray, and a screw 30, which passes through the block 29 and the bottom of the tray, engages an aperture in the said plate and is employed to clamp the block to the pivot rod.

In order to assist in bringing the plate 31 to proper position beneath the tray it is provided with a flange or flanges 32 along its rear edge which are adapted to engage with the rear edge of the bottom of the tray.

To lift the account slips from off the floor or bottom of a tray whenever it is opened, in order that they may be more easily accessible, I provide a movable slip-carrying frame, and so mount it that when the trays are closed it lies close within its tray, but when the tray is opened it rises, lifting the slips and exposing them above the upper edge of the front piece, 9. This slip-carrying frame is preferably made of wire and is designated as a whole by 33. The several parts thereof are shaped to constitute a base or support on which the slips rest and with stops or projections 34, for engaging with the front edges of the slips to hold them in place. Each frame is mounted so that it may be rocked or tilted to a limited extent relative to the tray with which it is associated. The methods of mounting the frames to permit this freedom of movement are numerous, but I prefer to employ that shown. The rear ends of the wire constituting the frame 33 are bent into U-shape, as indicated at 35, with the outer or free leg 36 bent upward and lengthened. The U-bends of the frame extend through apertures 47 in the bottom plate of the tray, and embrace portions 37 of the plate 31 situated below the tray bottom. 38 is a plate that is normally disposed substantially parallel with but above the bottom 7 of a tray, and is provided along its front edge with a flange 39, the ends 40 of which are caused to encircle the ends 36 of the bill-carrying frame. It will be seen, particularly by reference to Figs. 5, 7 and 9, that the slip-carrying frame normally lies close upon the upper face of the tray bottom to which it is connected near its rear end by the loops or U-shaped portions thereof 35, which loosely encircle the cross pieces 37, carried by the tray; and also that the frame is held in place by the sleeves or bent portions, 40, of the tilting plate 38.

Each tray is provided with a projection that is adapted, when the front end of the tray is lifted, to bear upon the tilting plate 38, and by depressing it, to rock the frame, lifting it from the bottom of the tray and so bringing the slips which it carries into convenient position to be handled, as described. This projection of the tray is conveniently provided by forming the plate 31 with an extension 41. Whenever a tray is raised or opened, either by hand or by the manipulation of a key 32, the projection 41 thereof bears down upon the lifting plate 38 of the slip-carrying frame of the tray that is opened and, rocking the latter, raises the slips from the bottom of the tray.

It will be seen that the means for counterbalancing the trays, and for maintaining them in raised positions, are located entirely to one side of the trays, that is to say, they are not located between the trays, and hence do not take up the space available for receiving and containing the slips, nor do they interfere with the free insertion or removal of the slips.

In all of the earlier account registers or appliances provided with a series of superposed tiltably mounted trays, of which I am aware, the sales slips when placed in the trays rest upon the bottom wall thereof and have to be raised by hand therefrom when it is desired to withdraw them from the tray. Various means have been provided in these earlier types of registers for facilitating the grasping of the slips within the trays, but in none of them, so far as I am aware, has there been any means provided for automatically elevating the slips from the bottom of a tray when the appliance is opened to expose the slips in the tray in question. Nor has there been heretofore devised an account register having a series of superposed sales slip receiving compartments normally closed to prevent dust and dirt from entering them and each provided with a slip carrying skeleton frame which when the appliance is opened at any compartment holds the slips in said compartment in position to be readily withdrawn therefrom. My invention greatly facilitates the removal of the slips from the trays, since when the appliance is opened to permit access to any given compartment, the bill carrying frame immediately positions the slips upon it so that they may be readily grasped and removed from the cabinet.

While I have, in the account appliance herein illustrated, shown the trays as complete in themselves, and capable of themselves receiving and carrying sales slips, it will be understood that they may be constructed and employed where the slip carrying frames 33 are used, simply as division members and index card holders, as it is not essential that the trays in themselves should be capable of carrying slips under such circumstances.

With a construction such as herein illustrated, the slips are filed in what may be considered substantially dust proof compartments. The front edges of the trays, the index card carrying ends, rest one upon the other and close up the front of each unit and no open space at the front of each compartment is left through which dust or dirt may readily enter.

I am aware of the fact that means have heretofore been provided for holding in elevated position the trays or shelves of a register or file, such for example as shown in the patent to Muhlauser No. 439,971, dated November 4th, 1890, but I believe myself to be the first to provide counterbalancing means for holding open the trays of a series of superposed trays in an account register or appliance and for assisting in elevating the trays above any given tray in the series to which it is desired to gain access.

Where desired, each finger key or push button may carry a number designating the number of the account as specified in an alphabetical index.

To those skilled in the art of making accounting appliances, many alterations in construction and many widely differing embodiments and applications of my invention will suggest themselves without departing from the spirit and scope thereof. My disclosures and description herein are purely illustrative and are not intended to be in any sense limiting.

What I claim is:

1. In an appliance of the character described, the combination of a set of trays normally arranged in superposed position, means for pivoting each tray to swing relative to an adjacent tray, and tension means connected to each tray and acting thereon substantially in line with its pivot when the tray is in normal position but arranged to counterbalance said tray when it is moved on its pivot.

2. An account cabinet comprising a set of superposed tiltably mounted trays, means tending to counterbalance the trays when their front ends are lifted, the said means being arranged in an inoperative position when the trays are closed, and means for lifting the trays and permitting the counterbalancing means to operate, substantially as set forth.

3. In an account cabinet, a set of superposed tilting trays, means for individually counterbalancing each tray, the said means being arranged in an inoperative position when the trays are closed, and means for slightly lifting the trays to throw said counterbalancing means into operation, substantially as set forth.

4. In an account cabinet, the combination of a supporting frame, a set of superposed trays pivotally supported therein, each arranged to be tilted so that any tray may be opened from the front, means individual to each tray for counterbalancing it and maintaining it in raised or opened position, the said means being arranged in an inoperative position when the trays are closed, and means for throwing the counterbalancing means into operation, substantially as set forth.

5. In an account cabinet, a unit comprising an upright frame inclining backward, a set of superposed tilting trays mounted in the said frame, means supported by the frame and connected with the individual trays for counterbalancing them, the said means being arranged substantially in line with the pivots of the trays when the latter are closed, and means for throwing the counterbalancing means of one or more trays into operation, substantially as set forth.

6. The combination with a casing, of a series of trays each pivotally mounted therein, a crank arm fixed to the pivot for each tray, a spring for counterbalancing each tray, one end of the spring being fixed to said casing and its opposite end connected with the free end of the adjacent crank arm and arranged substantially in line with the pivot of the adjacent tray when the latter is closed, and means for raising the free end of a crank arm to permit the adjacent counterbalancing spring to operate.

7. In an accounting appliance, the combination of a series of pivoted trays, means at one side of each tray operating to counterbalance the tray when its free end is slightly lifted, and means on the opposite side of each tray for lifting the free end thereof to throw the counterbalancing means into operation.

8. In an account cabinet, a unit comprising a base, a pair of side frame pieces, a set of trays pivotally supported in superposed relations between the side pieces, pivot shafts on which the trays are mounted, and devices outside the frame pieces connected with the pivot shafts for counterbalancing the trays, substantially as set forth.

9. In an account cabinet, a unit comprising a base, a supporting frame carried by the base and consisting of an inclined back and parallel side frame pieces extending forward therefrom, a series of trays, pivot shafts on which are supported the trays mounted in the side walls of the frame, means for counterbalancing each tray, and means carried by one of said side pieces and connected with each of said shafts for lifting the free ends of the trays, substantially as set forth.

10. In an account cabinet, the combination of a supporting frame, a set of superposed tilting trays, pivot shafts on which the trays are mounted supported in the frame, a crank arm for each shaft, and a spring connected with each crank arm and arranged substantially in line with the pivot of an adjacent tray and arranged to constitute a counterbalancing device therefor when the tray is lifted, substantially as set forth.

11. In an accounting appliance, the combination of a series of superposed trays, each pivoted upon a separate shaft, means for counterbalancing each tray, the said means being arranged in an inoperative position when the adjacent tray is in closed position, and means individual to each tray for tilting any one of said trays to throw the counterbalancing means therefor into operation, the tray tilted by the tray-tilting means operating to tilt all the trays above it.

12. The combination of a casing, a series of tiltable trays, a shaft for each tray supported in the casing and provided with a flattened portion, and means including a plate engaging said flattened portion, for securing the shaft and adjacent tray together.

13. In an account cabinet, the combination of a series of tilting trays, a set of keys corresponding with the trays, connections between the keys and the trays arranged to cause the operation of any key to lift the corresponding tray, and means for restoring the key to its normal position immediately after use independent of the position of the tray, substantially as set forth.

14. In an account cabinet, the combination of a set of pivoted trays arranged in superposed relations, a set of keys corresponding with the trays arranged alongside the latter, and connections between each key and its corresponding tray arranged to cause the tilting of the tray whenever the key is manipulated, substantially as set forth.

15. In an account cabinet, the combination of a supporting frame having a pair of side walls, one of which is provided with a side flange at its front edge, a set of superposed tilting trays arranged between the side walls, a set of keys mounted in the said side flange, the keys corresponding with the trays, and connections between the keys and the individual trays arranged to cause a tray to be tilted whenever the corresponding key is operated, substantially as set forth.

16. In an account cabinet, the combination of a supporting frame, a set of superposed trays, pivot shafts on which the trays are mounted supported in the frame, a set of keys corresponding with the trays, motion-transmitting devices connected with the shaft of each tray, and means for causing each key when operated to impart motion to the said motion transmitting devices of the tray corresponding with such key, substantially as set forth.

17. In an account cabinet, the combination of a supporting frame, a series of superposed tilting trays mounted therein, pivot shafts on which the trays are supported, keys corresponding with the individual trays, springs for returning the keys to normal position when not operated, and connections for tilting the individual trays, each connection being arranged to be operated by one key only when that is manipulated, the key being free to return to normal position independent of the position of the said connection.

18. In an account cabinet, the combination of a supporting frame, a series of superposed tilting trays, pivot shafts for the trays provided with crank arms, links connected with the crank arms, keys corresponding with the trays each arranged when manipulated to operate the links connected with a particular pivot shaft, and springs for restoring the keys to normal position after they have been operated, substantially as set forth.

19. A device for receiving and holding slips comprising a frame and an outer member, the frame normally resting on the bottom of the outer member and operating to receive and support on its upper side all the slips placed in the device and the outer member serving as an inclosure for said frame and the slips carried thereby, and means for pivoting the frame to the outer member, whereby the slips may be elevated above its upper edges.

20. In apparatus of the character described, the combination of a series of tiltable devices for receiving and holding slips, means for pivotally supporting said devices permitting them to tilt relatively to each other, each of said devices comprising a frame and an outer member, the frame normally resting on the bottom of the outer member and operating to receive and hold all the slips placed in said device and the outer member serving as an inclosure for the frame and the slips carried thereby, and means for pivotally connecting the frame to the outer member, whereby said frame may be operated independently of the outer member to raise the slips above the upper edges thereof.

21. The combination with a set of superposed tilting trays, holders for account slips arranged within the trays and free to move relative thereto, and means for lifting the front portions of the slip-holders arranged to operate the slip-holder below whenever a tray is tilted to open the said lower tray, substantially as set forth.

22. A device for receiving and holding slips comprising a frame and an outer member, the frame normally resting on the bottom of said outer member and operating to receive and support on its upper side all the slips placed in said device and the outer member serving as an inclosure for the frame and slips carried thereby, and means for pivoting the rear end of said frame to the rear end of said outer member, whereby the front ends of the slips may be elevated above the upper front edge of said outer member.

23. In an account cabinet, the combination of a set of superposed tilting trays, frames in the trays adapted to support sale slips, each frame being adapted to be tilted relative to the tray with which it is associated, and means for tilting the frame operated by the tray next above, when it is raised, substantially as set forth.

24. A device for receiving and holding slips, comprising a frame and an outer member, the said frame being formed of wire and bent to form a holder for receiving and supporting on its upper side all the slips placed in said device and normally resting on the bottom of said outer member, and the outer member serving as an inclosure for said frame and the slips carried thereby, and means for pivoting the said frame to the rear end of said outer member, whereby said frame is arranged to swing upwardly at its front end and permit access to the slips carried thereby.

25. The combination with a tray for filing account slips, of a light frame for holding the slips mounted within the tray, and loosely connected therewith near the rear end of the tray, a tilting plate connected with the holding frame and means for tilting the said frame, substantially as set forth.

26. In an account cabinet, the combination of a set of superposed pivoted trays for filing account slips, slip-holding frames arranged within the trays and loosely connected therewith near their pivoted ends, tilting plates connected with the said frames and projections carried by the trays, the projections of a tray above being arranged to bear upon the tilting plate of the frame of a tray below to tilt the frame whenever the tray above is raised, substantially as set forth.

27. In an account cabinet, the combination of a tray for filing account slips, a pivot shaft for supporting the tray having a flattened portion and clamping devices carried by the tray for uniting it with the flattened portion of the shaft, substantially as set forth.

28. An accounting appliance comprising a series of superposed sales slip receiving compartments having side and front walls, the latter being normally in contact with the front walls of the adjoining compartments, each of said compartments being pivoted at one end, and a series of skeleton slip carrying frames, normally arranged on the bottom of said compartments and open to permit the insertion and removal of sales slips therefrom, each of said frames being mounted to swing with the adjacent compartment when the latter is operated.

29. An accounting appliance, comprising a series of superposed sales slip receiving compartments, each compartment being normally closed and having a front wall, means for pivoting each of said compartments, and a skeleton sales slip carrying frame normally arranged on the bottom of each compartment, each frame being movable relative to the front wall of the adjacent compartment when access to said compartment is sought but arranged to swing with the adjacent compartment when the latter is operated about its pivot.

30. An account register comprising a series of superposed sales slip receiving compartments, each compartment being normally closed and having a front wall arranged to hold an index card, means for operating one or more of the compartments to permit access to the compartment therebelow, and a series of skeleton sales slip carrying frames, one in each compartment and movable relative to the front wall thereof when access to said compartment is sought, but arranged to move with the compartment when the latter is operated.

31. In a filing appliance, the combination of a series of superposed tiltable trays, a slip-supporting frame mounted in each tray, means for tilting one or more of the trays to open one of them, and means for elevating the slip-supporting frame in the tray that is opened.

32. In a filing appliance, the combination of a series of superposed tiltable trays, a slip-supporting frame mounted in each tray, means for tilting one or more of the trays to open one of them, and means for elevating the slip-supporting frame in the tray that is opened, the said frame elevating means being operated by the adjacent tilted tray.

33. In a filing appliance, the combination of a series of superposed tiltable trays, a slip-supporting frame mounted in each tray, means for tilting one or more of the trays to open one of them, and means operated by one of the tilted trays for elevating the slip-supporting frame in the tray that is opened.

34. In a filing appliance, the combination of a series of tiltable trays, shafts for supporting the trays at one end, a counterbalancing device for each tray connected therewith but held out of operative relation when the trays are in closed position, and a key mechanism for each tray for elevating any particular tray and throwing the counterbalancing device therefor into active operation, the operation of the particular tray operating to elevate all the trays above it.

35. In a device for receiving and holding slips, the combination of a support, a tray movably mounted therein, the said tray comprising an outer member serving to inclose the slips and a frame arranged within and normally resting upon the bottom of the outer member and operating to receive and support on its upper side all the slips placed in said tray, the said frame being of skeleton form to permit the grasping of the slips at their outer ends, and means for pivoting the frame to the outer member whereby the slips may be elevated above the upper edges of said outer member.

In testimony whereof I affix my signature in presence of two witnesses.

HARRY B. WHITE.

Witnesses:
J. WHITE, Jr.,
CHAS. M. BALL.

Copies of this patent may be obtained for five cents each, by addressing the "Commissioner of Patents, Washington, D. C."